Oct. 28, 1952 — S. T. CARTER — 2,615,555
ARTICLE DISTRIBUTOR FOR CONVEYERS
Filed Aug. 12, 1948 — 5 Sheets-Sheet 1
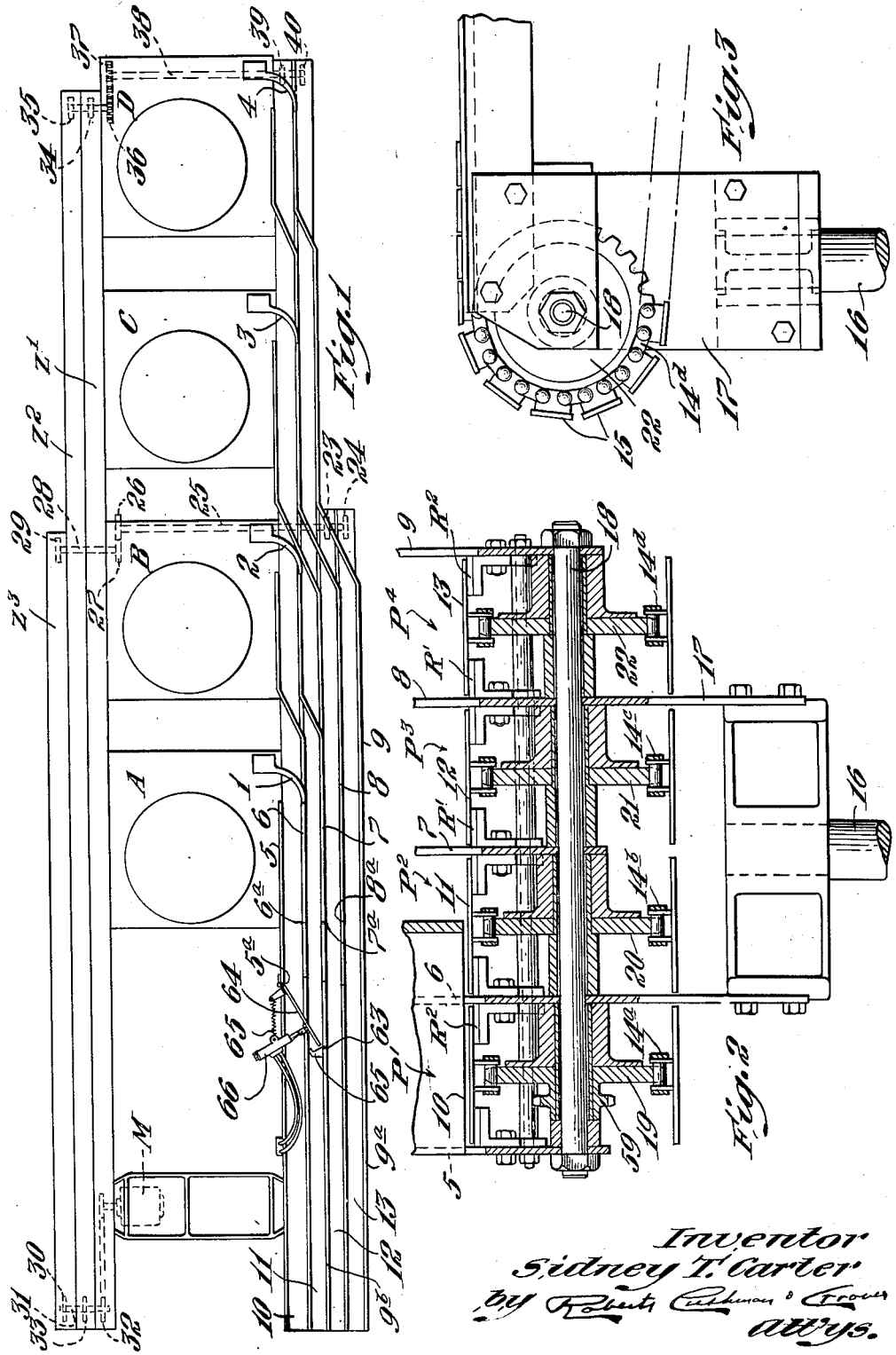
Inventor
Sidney T. Carter
by Roberts Cushman & Grover
attys.

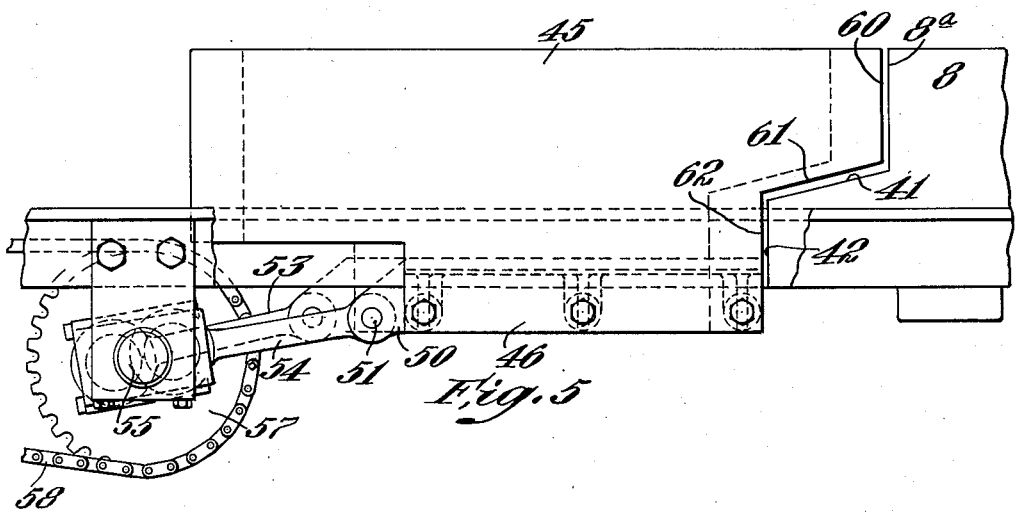
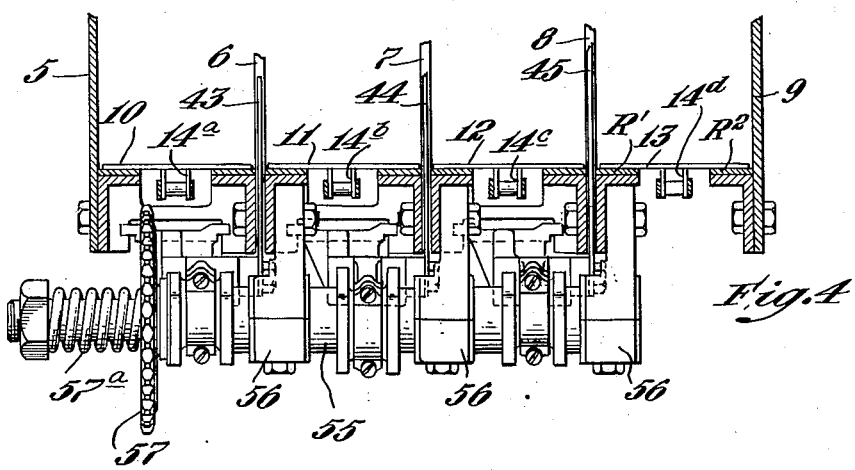
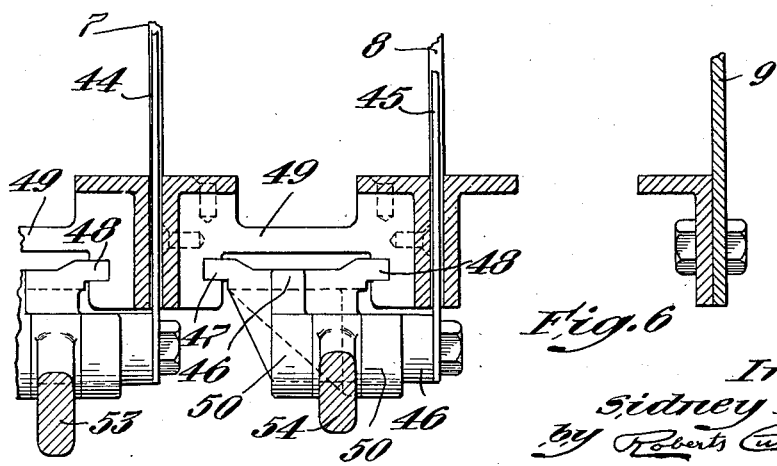

Oct. 28, 1952 S. T. CARTER 2,615,555
ARTICLE DISTRIBUTOR FOR CONVEYERS
Filed Aug. 12, 1948 5 Sheets-Sheet 3
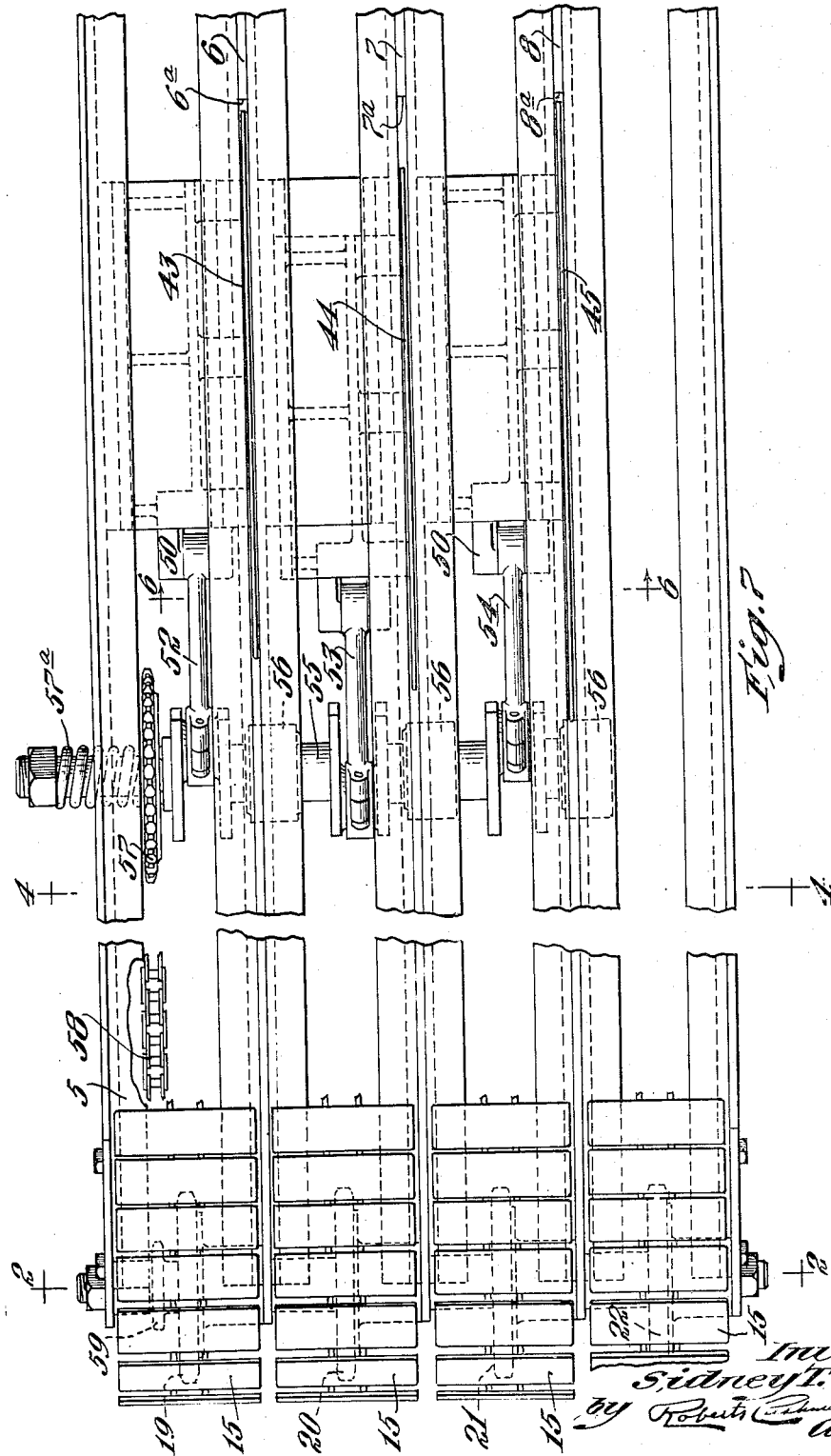

Oct. 28, 1952  S. T. CARTER  2,615,555
ARTICLE DISTRIBUTOR FOR CONVEYERS
Filed Aug. 12, 1948  5 Sheets-Sheet 4
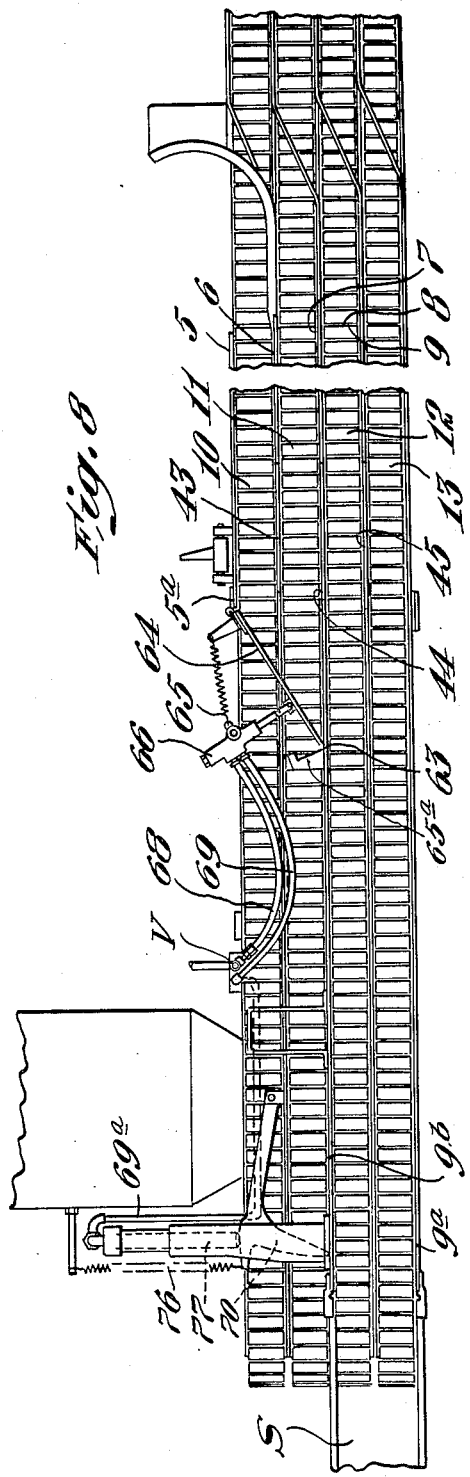
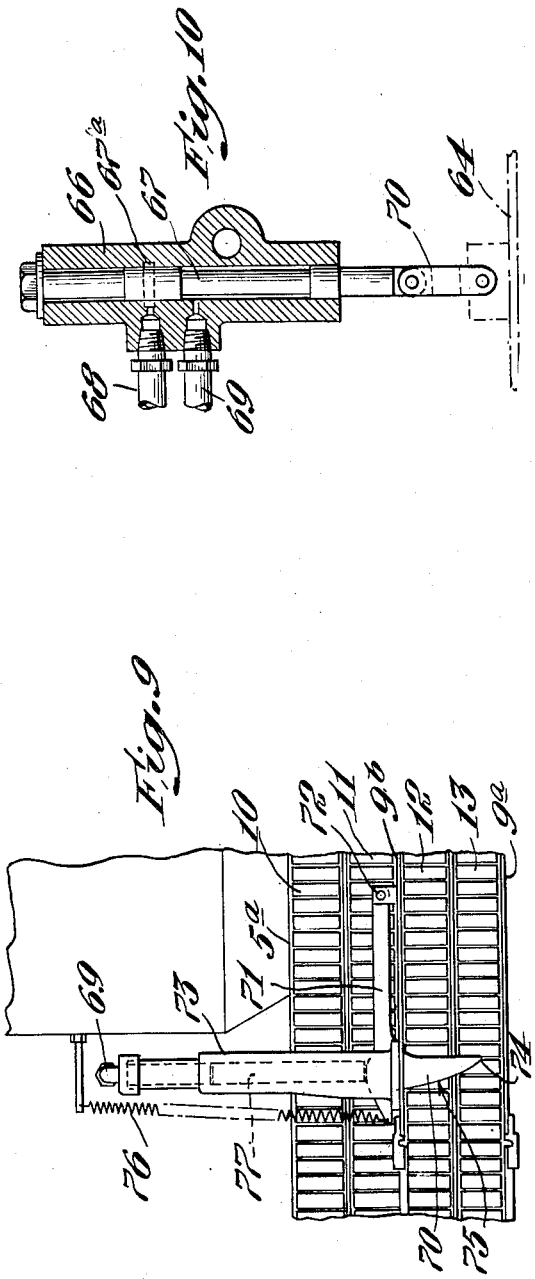
Inventor
Sidney T. Carter
by Roberts Cushman & Grover
att'ys.

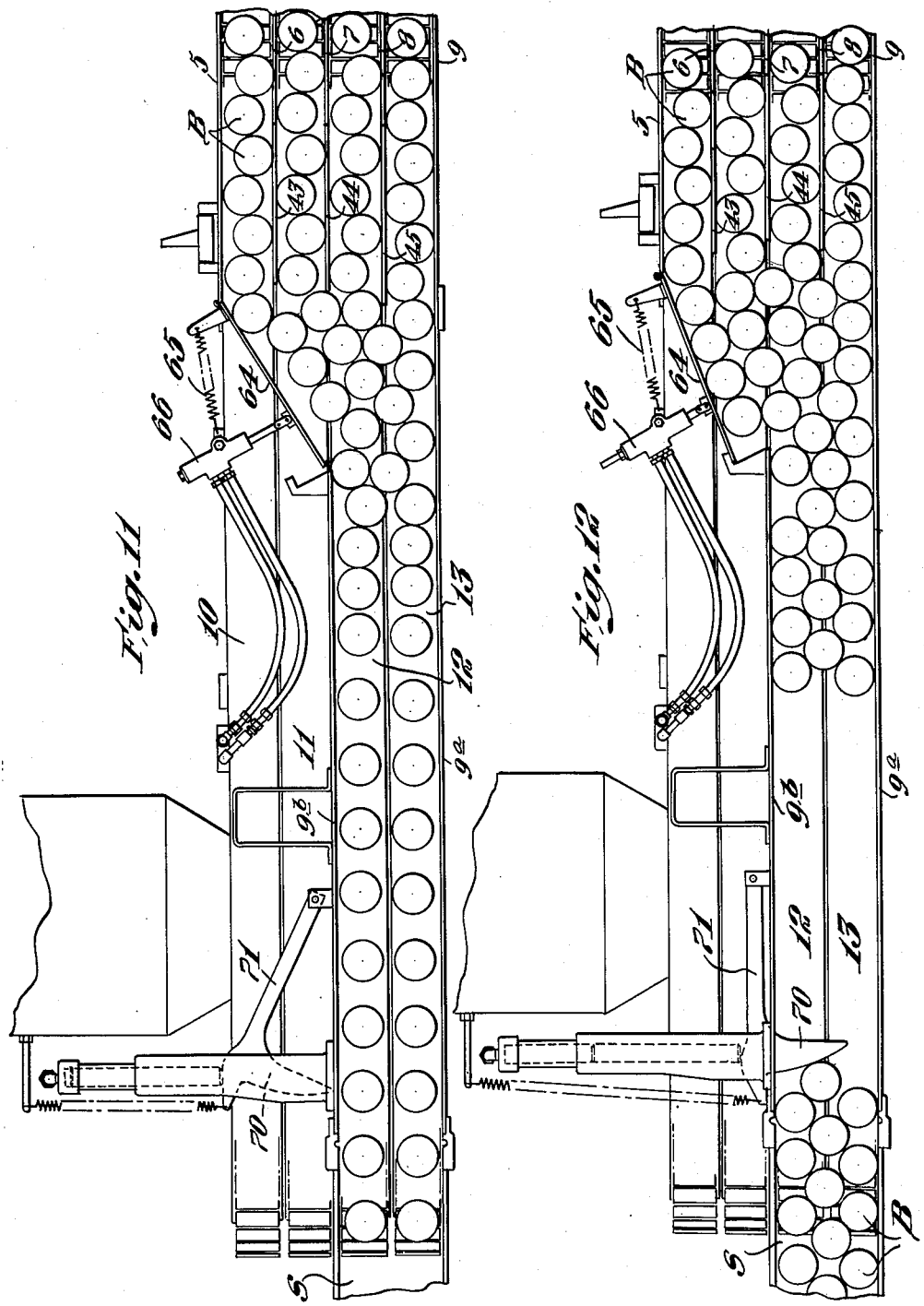

Patented Oct. 28, 1952

2,615,555

UNITED STATES PATENT OFFICE 2,615,555

ARTICLE DISTRIBUTOR FOR CONVEYERS

Sidney T. Carter, Worcester, Mass., assignor, by mesne assignments, to Geo. J. Meyer Manufacturing Co., Cudahy, Wis., a corporation of Wisconsin Application August 12, 1948, Serial No. 43,827

24 Claims. (Cl. 198—30)

This invention pertains to a conveyor of the kind which includes means, for example, a belt or chain, operative to move articles in a predetermined direction, and means, for instance, fixed guides, defining a plurality of parallel guide paths along each of which some of the moving articles are progressed to respectively different delivery points, for example, to several like but independent processing units, such, for instance, as label applying machines. Usually the articles, for example, cans, bottles, etc., are supplied to the conveyor belt or chain by means such as a feed belt or chute which delivers the articles to the receiving end of the conveyor belt or chain in a mass devoid of order or particular arrangement. This mass of articles is moved along by the conveyor belt toward the entrances to the several guide paths. It is usually desired that a substantially equal number of articles enter each of the respective guide paths. Customarily, the rails or walls which define the several guide paths are fixed. Sometimes an approaching article may strike squarely on the end of one of these fixed guide walls so that its movement is checked and this may result in the formation of a jam or bridge of articles which completely blocks the entrance to one or more of the guide paths. Various prior devices have been proposed for the purpose of avoiding such jamming of the articles at the entrances to the guide paths, and to insure proper division of the articles among the several paths, but most such prior devices known to me are complicated and expensive and not wholly to be relied upon.

The present invention has for its principal object the provision of a simple, inexpensive and very durable mechanism operative to prevent the jamming of articles at the entrances to the guide paths and to insure the adequate delivery of articles to each of the several paths. A further object is to provide a simple means operative to agitate the mass of articles as they approach the entrances to the guide paths, thereby to avoid the formation of a jam or bridge of articles at the entrances to the paths. A further object is to provide means applicable to existing conveyors for dividing approaching articles so that substantially equal numbers of articles will enter the several guide paths. A further object is to provide means for keeping clear the entrances to the guide paths, said means receiving its driving power from the conveyor belt or chain. A further object is to provide for temporarily slowing or stopping the flow of articles toward the entrances to the guide paths, if, for example, the demand for the article lessens, so that one or more of the guide paths is choked. Other and further objects and advantages of the invention will be pointed out in the following more detailed description and by reference to the accompanying drawings wherein:

Fig. 1 is a fragmentary plan view to small scale, diagrammatically illustrating a conveyor system serving a series of operating units, said conveyor system embodying the present invention;

Fig. 2 is a fragmentary vertical section, to much larger scale than Fig. 1, substantially on the line 2—2 of Fig. 7;

Fig. 3 is a fragmentary end elevation of the parts shown in Fig. 2, viewed from the right-hand side of the latter figure;

Fig. 4 is a fragmentary section, to larger scale than Fig. 1, substantially on the line 4—4 of Fig. 7;

Fig. 5 is an end elevation of the parts shown in Fig. 4, viewed from the right-hand side of the latter figure;

Fig. 6 is a fragmentary section, to larger scale, substantially on the line 6—6 of Fig. 7;

Fig. 7 is a fragmentary plan view, to larger scale than Fig. 1, of the receiving end of the conveyor system and illustrating details of the present improvement;

Fig. 8 is a fragmentary plan view of the receiving end of the conveyor, illustrating means, shown as a gate, for temporarily slowing or stopping the supply of articles when the demand for articles is diminished for any reason;

Fig. 9 is a fragmentary plan view, to larger scale than Fig. 8, showing the gate in operative relation to the supply path;

Fig. 10 is a fragmentary plan view, partly in horizontal section, of a control valve for the motor which actuates the gate;

Fig. 11 is a diagrammatic plan view, illustrating the normal flow of articles as they enter the several conveyor paths; and Fig. 12 is a similar view, illustrating the action of the flow arresting barrier.

Referring to Fig. 1 of the drawings, the conveyor of the present invention is illustrated as designed to supply articles to a series of processing units A, B, C and D which would usually be alike in structure and function, for example, each of these units may be a label applying machine, a wrapping machine, a package filling machine, etc., to which articles are delivered one after another in succession, and after being processed are discharged and conveyed away to some convenient point, for example to a packing and shipping station.

As here illustrated, the articles are brought to the receiving end of the conveyor from a source of supply by an endless belt S or the like (Fig. 8) which advances the articles in a confused mass, that is to say, the articles are advanced in disorderly fashion without predetermined relative arrangement. The articles thus received are divided and advanced along guide paths P1, P2, P3 and P4 (Fig. 2), here shown as parallel, from which the articles are deflected by appropriate deflector means, here shown (Fig. 1) as fixed curved guides 1, 2, 3 and 4, respectively, for delivery to the several units A, B, C, D, etc. After being processed, the articles are discharged from the units A, B, C, D, etc. onto endless conveyor belts Z1, Z2, Z3 which deliver the articles to any desired point, for instance, to a packing and shipping room.

The guide paths P1, P2, P3 and P4 are defined (for substantial portions at least of their lengths) by fixed vertical walls 5, 6, 7, 8 and 9 (Figs. 1, 2 and 8) which are rigidly supported by the conveyor frame. The floors of the guide paths P1, P2, P3 and P4 are formed, respectively, by the upper runs 10, 11, 12 and 13 (Fig. 2) of endless conveyors. These conveyors may be belts of canvas, rubber or the like suitably supported to provide substantially flat, horizontal runs, but, as here specifically illustrated, each conveyor comprises an endless link chain 14$^a$, 14$^b$, 14$^c$ and 14$^d$, respectively (Fig. 2), each chain carrying a series of flat, smooth, wear-resistant slats 15 (Fig. 3), for example slats of stainless steel whose opposite ends rest upon and are guided by fixed rails R1, R2 (Fig. 2) so arranged as to hold the upper run of the conveyor, consisting of the slats 15, firmly and in a horizontal plane.

At the receiving end of the conveyor a fixed column or post 16 (Figs. 2 and 3) supports a bracket 17 which carries bearings for a transverse shaft 18 on which are mounted to turn freely the sprocket wheels 19, 20, 21 and 22 about which the chains 14$^a$, 14$^b$, 14$^c$ and 14$^d$, respectively, are trained. At their right-hand ends (Fig. 1) the chains 14$^c$ and 14$^d$ are trained about sprocket wheels 23 and 24 (Fig. 1), respectively, fixed to a transverse drive shaft 25. A gear 26, fixed to the shaft 25, meshes with a pinion 27 fixed to a shaft 28 which carries a sprocket wheel 29 about which is trained an endless chain which carries the delivery conveyor Z3. The opposite end of the latter conveyor chain is trained about a sprocket 30 on a shaft 31 to which are fixed drive sprockets 32 and 33 for the chains of conveyors Z1 and Z2, the shaft 31 being driven by a variable speed motor M. The right-hand ends (Fig. 1) of the chains of the conveyors Z1 and Z2 are trained about sprockets 34 and 35, respectively, fixed to a transverse shaft carrying a pinion 36 which meshes with a gear 37 on a shaft 38. The shaft 38 has fixed thereto the sprockets 39 and 40 about which the right-hand ends of the chains 14$^a$ and 14$^b$ are trained.

While a desirable system of drive connections for the several conveyors has herein been described and illustrated, it is to be understood that the present invention is not necessarily limited to these particular driving connections.

The guide walls 6, 7 and 8 terminate at the points 6$^a$, 7$^a$ and 8$^a$ (Figs. 1 and 7). Preferably the ends of these guide walls comprise upper vertical portions (Fig. 5), inclined intermediate portions 41 and lower vertical portions 42. Each of these guide walls 6, 7 and 8 has associated with it, respectively, an elongate blade-like agitator or bridge-breaker 43, 44 and 45 (Figs. 2, 5, 7 and 8). These agitators or bridge-breakers are disposed in the same vertical planes as the corresponding fixed guide walls 6, 7 and 8 and are supported for longitudinal movement. As here illustrated, by way of example, each of the agitators or plows 43, 44 and 45 is fixed at its lower edge to a slide or carrier 46 (Figs. 5 and 6) which has horizontal flanges 47 and 48 which slide in guideways in a support 49 fixed to the carrier frame. At one end, each of the slides or carriers 46 is provided with ears 50 (Fig. 5) in which are journaled the opposite ends of a pin 51 on which one end of a connecting rod is pivoted. These connecting rods 52, 53 and 54 (Figs. 5, 6 and 7) have journal openings at their opposite ends for cranks on a horizontal crank shaft 55 (Figs. 5, 6 and 7) which turns in bearings 56 (Fig. 4) supported by the conveyor frame. Preferably the cranks are so related that the agitators 43, 44 and 45 are reciprocated in out-of-phase relation, for example, the crank to which rod 53 is connected may be at an angle of 180° relatively to the cranks to which the rods 52 and 54 are connected. Other arrangements of the cranks may be employed, for instance, the three cranks may be arranged 120° apart.

The crank shaft 55 is provided with a sprocket wheel 57 which is loose on the shaft but which is frictionally connected to the shaft by a friction clutch comprising the adjustable tension spring 57$^a$ (Fig. 4). This arrangement is designed to permit sufficient slip between the sprocket wheel and the shaft to prevent any breakage of articles or machine parts in the event that the articles moving along the conveyor should become jammed.

A chain 58 passes about the sprocket wheel 57 and over a sprocket 59 (Figs. 2 and 7) fixed to the shaft 18 so that as the conveyors move the articles toward the entrances to the guide paths P1, P2, P3 and P4, the plates 43, 44 and 45 are reciprocated longitudinally of the advancing conveyors. The right-hand ends of the agitators or plows 43, 44 and 45 are preferably shaped complementally to the ends of the fixed guides 6, 7 and 8, as shown in Fig. 5, having the vertical upper portions 60, the inclined portions 61 and the lower vertical portions 62. Thus, the upper right-hand portions of the agitators 43, 44 and 45 overhang the left-hand end portions of the fixed walls 6, 7 and 8 so as to lessen the danger that some part, for example, the hand of the operator, may accidentally be caught between the opposed edges of the plates. However, these opposed edges of the fixed and movable parts may be vertical or otherwise contoured as desired.

The vertical plane of the left-hand ends 6$^a$, 7$^a$ and 8$^a$ of the fixed walls or plates 6, 7 and 8 defines the entrances to the guide paths P1, P2, P3 and P4. As articles approach these entrances, the left-hand ends of the reciprocating agitator plates 43, 44 and 45 thrust into the moving mass of articles, acting somewhat like plows, with a tendency to cause the articles with which they contact to diverge either to the right or left, thus effectively preventing articles from coming to rest against the left-hand ends of the fixed walls 6, 7 and 8. Without the reciprocating agitator plates, articles might come to rest straddling the ends of the fixed walls, thus narrowing the entrances to the guide paths with resultant jamming and interference with proper flow of the articles into the several guide paths.

Sometimes, because of a temporary stoppage of one or more of the units A, B, C or D while the articles continue to approach the entrances to the guide paths at the normal rate, an abnormal accumulation of articles may occur just to the left of the left-hand ends of the agitator plates because the collective capacity of the guide paths is now exceeded. In such event, articles may actually pile up and overflow the walls 5 and 9 at this point, causing damage to the articles themselves or, by breakage of the articles, spilling their contents with damage to the conveyor mechanism and with loss of time in restoring the mechanism to proper operating condition. Moreover, since the agitator plates are actuated through the medium of the friction clutch, which is necessary to prevent breakage of articles or machine parts, the pressure resultant from an undue accumulation of articles at the entrances to the guide paths would cause slippage of the clutch and complete stoppage of the agitator blades. To avoid such undesirable occurrences, the present invention automatically stops the supply in response to the presence of any such abnormal accumulation of articles in the region of the agitator plates 43, 44 and 45. To this end flow-restricting means is provided, here illustrated as a movable gate or barrier, which, when required to do so, narrows or completely closes the path along which the articles are supplied.

As illustrated in Figs. 1 and 8, the fixed outer wall 5 terminates at the point 5a, while the fixed wall 9 has a continuation 9a extending substantially to the receiving end of the conveyor. A continuation 9b of the fixed wall 7 begins at the point 63 and extends to the receiving end of the conveyor. A pivoted gate-like detector 64 is pivoted to swing about a vertical axis adjacent to the point 5a and normally extends diagonally across the conveyors 10 and 11 with its free end disposed substantially at the point 63. A spring 65 tends to hold the detector in this position but permits it to swing in response to pressure against its right-hand surface (Figs. 1 and 8). A fixed stop 65a limits such swing of the detector. The space immediately to the right of the detector 64, as shown in Figs. 11 and 12, is devoid of separating walls intermediate the walls 5 and 9, thus providing a space or plenum chamber within which articles delivered from the supply are free to move transversely and to find their way into the entrance of one or another of the guide paths.

A valve housing 66 (Figs. 1, 8 and 10) is fixed to the conveyor frame and houses a piston valve 67 which controls the flow of compressed air from a suitable source through the conduit 68 to the conduit 69. Preferably the valve 67 has a peripheral, pressure-balancing groove 67a. The outer end of the piston valve is connected by a link 70 to the detector 64, the arrangement being such that when the detector is in normal position the valve is closed, but when the detector is swung rearwardly from its normal position the valve is opened to admit compressed air to the conduit 69.

Adjacent to the receiving end of the conveyor, where the articles are delivered by the belt S into the supply path defined by the fixed guide walls 9a and 9b, there is arranged a movable gate or barrier 70 (Figs. 8 and 9). This gate 70 is fixed at its rear end to an elongate supporting arm 71 pivoted at 72 to swing about a vertical axis at the rear side of the wall 9b. The free or left-hand end portion of the arm 70 moves in a horizontal guide slot in a horizontally elongate casing 73 fixed at its front end to the rear side of the wall 9b, the latter wall having a slot through which the gate 70 may project across the supply path. The gate 70 tapers in width from its rear end toward its forward end or tip 74, the latter being narrow and smoothly rounded, while the edge 75, which is contacted by articles approaching along the supply path, is preferably curved on an arc concentric with the pivotal axis 72. A spring 76 tends to hold the arm 71 with the gate 70 in retracted, inoperative position, as shown in dotted lines in Fig. 8, with the tip 74 of the gate completely withdrawn from the supply path.

The casing 73 has an elongate cylindrical bore in which slides a piston 77 whose forward end bears against the rear edge of the arm 71. The conduit 69 has an extension 69a arranged to deliver air into the rear end of the casing 73 at a point behind the rear end of the piston 77. An appropriate pressure-reducing valve V may be provided between the supply and the conduit 68 to insure a proper air pressure for delivery into the cylinder of the casing 73.

Normally the parts 64 and 70 occupy the positions indicated in Figs. 8 and 11, the articles B (for example bottles) advancing between the walls 9a and 9b until they reach the plenum chamber and zone of action of the agitators 43, 44 and 45 where they are free to move laterally so that a substantially equal number of bottles enter each of the guideways defined by walls 5, 6, 7, 8 and 9. However, if by reason of the shutting down of one or more of the units A, B, C, etc., or because articles become jammed in one of the guide paths P1, P2, etc., so that one or more of said paths becomes filled or choked with articles which are standing still (the moving floor of the corresponding conveyor then sliding relatively to the stalled articles) while articles continue to be supplied along the path between the walls 9a and 9b at the usual rate, the articles tend to accumulate in abnormal quantity in the plenum chamber of which the detector 64 forms one wall. Eventually, unless the choked guide path P1, P2, etc. is cleared, the accumulation becomes so great that the articles press against the detector 64 with sufficient force to push the latter rearwardly (Fig. 12), thus opening the air admission valve and permitting air to flow to the bore in the casing 73. The piston 77 is thereby advanced so as to move the gate 70 across the supply path. The shape of the gate is such that it readily enters between articles moving along the supply path, and, when the gate is moved across the supply path, it temporarily arrests those bottles which are to the left of the gate (Fig. 12) so that they can not be added to the mass in the zone of action of the agitators 43, 44 and 45. The gate remains in this article-arresting position so long as the detector 64 is held back by the pressure of articles against it. This may be but for an instant or it may be for a substantial period. During this period the accumulation of articles in the plenum chamber is gradually depleted by the entrance of articles into such of the guide paths P1, P2, etc., as are clear, and eventually the accumulation becomes so small that the detector 64 returns to its normal position, thus closing the air admission valve and permitting the spring 76 to restore the gate 70 to its normal inoperative position so that the normal flow of articles along the supply path is resumed.

By the above means, and in particular by the cooperative relation of the agitating members and the flow-constricting means, a steady and substantially uniform flow of articles into the entrances to the guide paths is assured, the articles automatically distributing themselves between the several guide paths by reason of the fact that they are kept in constant agitation as they approach said entrances by the motion of agitator plates, while the possibility of choking the entrances by an abnormal accumulation of articles seeking entrance to said paths is substantially prevented by the flow-constricting gate controlled by the detector 64.

While a desirable embodiment has herein been illustrated and described by way of example, it is to be understood that the invention is broadly inclusive of any and all modifications falling within the scope of the appended claims.

I claim:

1. In combination, in apparatus of the class described, a plurality of fixed parallel guides defining paths for articles, a smooth-surfaced conveyor operative to move articles simultaneously along all of said paths, a movable support operative to advance a mass of articles toward the entrances to said paths, means for agitating the articles as they approach said entrances thereby to facilitate their entry into the several paths, means including a slip clutch for actuating the agitating means, and means operative temporarily to discontinue the advance of articles toward said entrances in response to the presence of an abnormal accumulation of articles within the field of operation of the agitating means.

2. In combination, in apparatus of the class described, a plurality of fixed parallel guides defining paths for articles, an endless chain provided with smooth-surfaced, rigid slats which collectively constitute a moving support for articles advancing along said paths, a movable support operative to advance a confused mass of articles toward the entrances to said paths, means for agitating the articles as they approach said entrances thereby to facilitate their entry into the several paths, means, including a friction clutch, for actuating said agitating means, and means operative in response to the presence of an abnormal accumulation of articles at the entrances to said paths, temporarily to block the path along which articles are advanced toward said entrances.

3. In combination, in apparatus of the class described, a plurality of fixed parallel guides defining paths for articles, conveyor means operative to move articles simultaneously along all of said paths, an endless chain provided with smooth-surfaced rigid slats which collectively constitute a moving support operative to advance a confused mass of articles toward the entrances to said paths, means for agitating the articles as they approach said entrances thereby to facilitate their entry into the several paths, means including a friction clutch for actuating the agitating means, a movable detector spaced from the entrances to said paths and which is movable from a normal position by the pressure of an abnormal accumulation of articles adjacent to the entrances to said paths, a gate for cutting off the supply of articles, and means responsive to movement of the detector from its normal position to move the gate to a position where it stops the supply of articles.

4. In combination in apparatus of the class described, a plurality of fixed parallel guides defining paths for articles, a conveyor operative to move articles simultaneously along all of said paths, a movable support operative to advance a confused mass of articles toward the entrances to said paths, means for agitating the articles as they approach said entrances thereby to facilitate their entry into the several paths, a movable detector spaced from said agitating means, means including a slip clutch for actuating the agitating means, in the direction from which articles approach, said detector being so normally positioned that it is out of the path of articles but is movable from its normal position by the pressure of an abnormal accumulation of articles adjacent to the entrances to said paths, and a movable barrier operative at times to prevent advance of articles from the supply, said barrier being responsive to movements of the detector.

5. In combination in a conveyor having a plurality of parallel, fixed guides defining paths for articles, means operative to advance a confused mass of articles toward the entrances to said paths, those of said fixed guides which separate adjacent paths each having a movable extension directed toward the mass of approaching articles, and means for moving said extensions back and forth in out-of-time relation to each other.

6. In combination in a conveyor having a plurality of parallel, fixed vertical walls defining paths for articles, a moving support operative to advance articles toward the entrances of said paths, means operative to deliver a confused mass of articles onto the support, and means for agitating said mass as it approaches the entrances to said paths, said agitating means comprising vertical, bridge-breaking blades disposed in the planes of each of said guide walls which separates adjacent paths, and means for reciprocating said members in out-of-time relation to each other.

7. In combination in a conveyor having a plurality of parallel, fixed vertical walls defining paths for articles, a moving support operative to advance articles toward the entrances of said paths, means operative to deliver a confused mass of articles onto the support, and means for agitating said mass as it approaches the entrances to said paths, said agitating means comprising a movable bridge-breaking blade arranged to move in the plane of a guide wall which separates adjacent paths, a shaft extending transversely of the support and below the plane of the latter, cranks carried by said shaft, a connecting rod for transmitting motion from each crank to said blades, and means for rotating the shaft.

8. In combination in a conveyor designed to supply articles to a plurality of processing units to which the articles are delivered along individual guide paths, means for advancing the articles in a confused mass toward the entrances to said guide paths and fixed guide walls defining said paths, a reciprocating agitator adjacent to the entrance to each guide path and which is movable toward and from the advancing mass of articles, a crank shaft having thereon cranks corresponding in number to the number of agitators, connecting rods for transmitting motion from the several cranks to the respective agitators, the cranks being so angularly disposed that the agitators are reciprocated in out-of-phase relation, and means for turning the crank shaft.

9. In combination in a conveyor designed to supply articles to a plurality of processing units to which the articles are delivered along individual guide paths, means for advancing the articles in a confused mass toward the entrances to said guide paths and fixed guide walls defining said paths, a reciprocating plow adjacent to the entrance to each guide path and which is movable toward and from the advancing mass of articles, a crank shaft having thereon cranks corresponding in number to the number of plows, connecting rods for transmitting motion from the several cranks to the respective plows, and means including a slip clutch for turning the crank shaft.

10. In combination in a conveyor designed to supply articles to a plurality of processing units to which the articles are delivered along individual guide paths, means for advancing the articles in a confused mass toward the entrances to said guide paths and fixed guide walls defining said paths, a reciprocating agitator adjacent to the entrance to each guide path and which is movable toward and from the advancing mass of articles, a crank shaft having thereon cranks corresponding in number to the number of agitators, connecting rods for transmitting motion from the several cranks to the respective agitators, the cranks which drive adjacent agitators being arranged 180° apart, and means including a friction clutch for turning the crank shaft.

11. In combination in a conveyor designed to supply articles to a plurality of processing units to which the articles are delivered along independent guide paths and having an endless chain provided with smooth surfaced, rigid slats which collectively constitute a moving support for articles advancing toward the entrances to the several guide paths, fixed parallel walls defining the guide paths, an agitator element at the entrance to each guide path, a slidable support for each agitator, and power-driven means for sliding the several supports in out-of-phase relation.

12. In combination in a conveyor designed to supply articles to a plurality of processing units to which the articles are delivered along independent guide paths and having an endless chain provided with smooth surfaced, rigid slats which collectively constitute a moving support for articles advancing toward the entrances to the several guide paths, fixed parallel walls defining the guide paths, each guide wall, except the exterior ones, having a movable extension at that end which is directed toward the approaching articles, each of said extensions being carried by a reciprocable slide, a crank shaft having thereon a plurality of cranks, connecting rods for transmitting motion from the several cranks to the respective slides, and drive means including a friction clutch for turning the crank shaft.

13. In combination in a conveyor having means defining a plurality of parallel guide paths, all leading from a common plenum chamber, means operative to move articles along all of the several paths concomitantly, means for supplying articles for admission to the several paths, and automatic means operative, if the rate of supply of articles exceeds the collective capacity of said guide paths, temporarily to cut off the supply to the plenum chamber, bridge-breaking elements operative to prevent articles within the plenum chamber from bridging across the entrances to the several guide paths, and means including a friction clutch for actuating the bridge-breaking elements.

14. In combination in a conveyor having means defining a plurality of guide paths all leading from the same plenum chamber, means operative to move articles along all of the several guide paths concomitantly, means for supplying articles for admission to the several paths, a detector arranged adjacent to the entrances to said guide paths and which responds to the presence of an abnormal accumulation of articles within the plenum chamber, and means controlled by the detector for cutting off the supply of articles to the plenum chamber, bridge-breaking elements operative to prevent articles within the plenum chamber from bridging across the entrance to the several guide paths, and means including a friction clutch for actuating the bridge-breaking elements.

15. In combination in a conveyor having means defining a plurality of guide paths leading from a plenum chamber, means operative to move articles along all of the several paths concomitantly, means for supplying articles to the plenum chamber, flow-resistricting means for cutting off the supply of articles and a movable detector element which forms one wall of the plenum chamber and which moves from a normal position in response to an abnormal accumulation of articles in said chamber, and means actuable by the detector element to determine the operation of the flow-restricting means bridge-breaking elements operative to prevent articles within the plenum chamber from bridging across the entrances to the several guide paths, and means including a friction clutch for actuating the bridge-breaking elements.

16. In combination in a conveyor having means defining a plurality of guide paths, means for moving articles along the several paths, means for moving articles along a supply path toward the entrances to the several guide paths, a gate normally disposed out of the supply path, a pivotally supported arm on which the gate is mounted, a spring tending to hold the gate in normal inoperative position, a pressure motor for moving the gate across the supply path, a detector adjacent to the entrances to said guide paths, said detector moving in response to the presence of an abnormal accumulation of articles at said entrances, and a valve actuable by the detector for determining the admission of pressure fluid to the gate-actuating motor.

17. In combination in a conveyor having means defining a plurality of guide paths, means for moving articles along the several paths, means for advancing articles along a supply path toward the entrances to the several guide paths, a gate for constricting the supply path, said gate being supported at one end and swinging about a substantially vertical axis located at one side of said supply path, the gate tapering in width toward its free end, that side of the gate which is contacted by articles moving along the supply path being curved on an arc concentric with the axis about which the gate swings, a spring tending to retract the gate, a pressure motor for advancing the gate, a valve for determining the delivery of compressed air to the motor, and a detector responsive to the presence of an abnormal accumulation of articles adjacent to the entrances to said guide paths for opening the valve.

18. In combination in a conveyor having means defining a plurality of guide paths leading from a plenum chamber, means for moving articles along the several paths, means for advancing articles along a supply path into the plenum chamber, a barrier movable from a normal inoperative position to a position in which it restricts the flow of articles along the supply path, a movable detector element so located as to move in response to the pressure of an abnormal accumulation of articles within the plenum chamber, means responsive to such movement of the detector thereby to cause the barrier to move across the supply path, bridge-breaking elements operative to prevent articles within the plenum chamber from bridging across the entrances to the several guide paths, and means including a friction clutch for actuating the bridge-breaking elements.

19. In combination in a conveyor having means defining a plurality of guide paths all leading from a plenum chamber, means for moving articles along the several paths, means for advancing articles along a supply path into the plenum chamber, a gate normally disposed out of the supply path but which is movable across the supply path thereby temporarily to stop the supply of articles, a pivotally supported detector which forms one wall of the plenum chamber and which moves in response to the pressure of an abnormal accumulation of articles within said plenum chamber to said paths, power means controlled by said detector for moving the gate across the supply path, bridge-breaking elements operative to prevent articles within the plenum chamber from bridging across the entrances to the several guide paths, and means including a friction clutch for actuating the bridge-breaking elements.

20. In combination in a conveyor having a plurality of independent guide paths along which articles move on their way to a plurality of processing units respectively, said guide paths all leading from a plenum chamber, means for advancing articles into the plenum chamber, means operative to stop the advance of articles to the plenum chamber whenever a congestion of articles occurs in any one of said guide paths resulting in an abnormal accumulation of articles in the plenum chamber, bridge-breaking elements operative to prevent articles within the plenum chamber from bridging across the entrances to the several guide paths, and means including a friction clutch for actuating the bridge-breaking elements.

21. In combination in a conveyor having a plurality of independent guide paths along which articles move on their way to a plurality of processing units respectively, said paths all leading from a common plenum chamber, means for advancing articles into the plenum chamber, a barrier disposable across the path of approach of articles toward the entrances to said guide paths, means responsive to a congestion of articles in the plenum chamber resultant from the blocking of one or more of said guide paths, to dispose the barrier in the path of articles approaching the plenum chamber, bridge-breaking elements operative to prevent articles within the plenum chamber from bridging across the entrances to the several guide paths, and means including a friction clutch for actuating the bridge-breaking elements.

22. In combination in apparatus of the class described a plurality of independent guide paths which articles may move on their way to a plurality of processing units respectively, a smooth-surfaced conveyor operative to move articles simultaneously along all of said paths, means for advancing articles toward the entrances to said paths, a detector which moves in response to the pressure of an abnormal accumulation of articles at the entrances to said paths due to congestion of articles in one or more of said paths, means actuable by said detector for stopping articles approaching the plenum chamber, bridge-breaking elements operative to prevent articles within the plenum chamber from bridging across the entrances to the several guide paths, and means including a friction clutch for actuating the bridge-breaking elements.

23. In combination in apparatus of the class described, a plurality of independent guide paths along which articles move on their way to a plurality of processing units respectively, all of said paths leading from a common plenum chamber, an endless chain provided with smooth-surfaced rigid slats which collectively constitute a conveyor for advancing articles along a supply path into said plenum chamber, a pivotally mounted detector which is so located as to be moved from its normal position by the pressure of an abnormal accumulation of articles within said plenum chamber due to reduction in the rate of flow of articles along any of said guide paths, a barrier disposable in the supply path along which articles approach said plenum chamber, and means for moving said barrier across said supply path in response to movement of the detector.

24. In combination in a conveyor having a plurality of independent guide paths along which articles move on their way to a plurality of processing units respectively, means for advancing articles toward the entrances to said guide paths, a detector arm pivoted to swing about a vertical axis, a spring normally holding said arm in a position such that it will be contacted by an abnormal accumulation of articles adjacent to the entrances to said guide paths, an air admission valve connected to said detector arm, said valve being constructed and arranged to control the flow of compressed air through a conduit, a pressure motor to which said conduit supplies air, a barrier movable by said motor into the path along which articles approach the entrances to said parallel paths, bridge-breaking elements operative to prevent articles within the plenum chamber from bridging across the entrances to the several guide paths, and means including a friction clutch for actuating the bridge-breaking elements.

SIDNEY T. CARTER.

REFERENCES CITED

The following references are of record in the file of this patent:

UNITED STATES PATENTS

| Number | Name | Date |
|---|---|---|
| 710,574 | Grossmann | Oct. 7, 1902 |
| 1,090,855 | Jagenberg | Mar. 24, 1914 |
| 1,597,540 | Parker | Aug. 24, 1926 |
| 1,755,721 | Winkler | Apr. 22, 1930 |
| 1,931,114 | Olney | Oct. 17, 1933 |
| 2,037,931 | Schmidt | Apr. 21, 1936 |
| 2,183,433 | Rheinstrom | Dec. 12, 1939 |
| 2,333,576 | Kerr | Nov. 2, 1943 |